(12) United States Patent
Eichenberger

(10) Patent No.: US 7,570,300 B2
(45) Date of Patent: Aug. 4, 2009

(54) CAMERA POSITIONING DEVICE

(75) Inventor: Louis Carl Eichenberger, Weatherford, TX (US)

(73) Assignee: General Electric Company, Schenectady, NY (US)

( * ) Notice: Subject to any disclaimer, the term of this patent is extended or adjusted under 35 U.S.C. 154(b) by 729 days.

(21) Appl. No.: 10/424,689

(22) Filed: Apr. 29, 2003

(65) Prior Publication Data

US 2004/0218091 A1 Nov. 4, 2004

(51) Int. Cl.
*H04N 5/225* (2006.01)
(52) U.S. Cl. .................................... 348/373; 396/421
(58) Field of Classification Search ................. 348/373, 348/376, 84, 85, 143, 207.99; 398/421; 248/183.1
See application file for complete search history.

(56) References Cited

U.S. PATENT DOCUMENTS

| | | | | |
|---|---|---|---|---|
| 6,056,450 A | * | 5/2000 | Walling | 396/428 |
| 6,076,978 A | * | 6/2000 | McIlvenna | 396/425 |
| 6,932,305 B2 | * | 8/2005 | Morales et al. | 396/428 |
| 6,962,313 B1 | * | 11/2005 | Marks, Jr. | 248/200 |
| 2003/0001963 A1 | * | 1/2003 | Masuyama et al. | 348/374 |
| 2004/0206863 A1 | * | 10/2004 | Tillschneider | 248/177.1 |

\* cited by examiner

*Primary Examiner*—Lin Ye
*Assistant Examiner*—Gevell Selby
(74) *Attorney, Agent, or Firm*—Harness, Dickey & Pierce

(57) ABSTRACT

A camera positioning apparatus includes a primary support portion having an arm and two opposing support members. An adapter can be positioned on an arm to accept any standard handling pole. A camera having an exit cable can be positioned between the support members and can be held in place by a holding member, such as a clamp. A spring located between the holding member and one of the support members provides a spring tension to position the holding member at a reference position. Positioning the camera is accomplished by pulling on and/or releasing the exit cable. Rotation of the camera positioning device can be accomplished by turning the handling pole attached to the adapter.

19 Claims, 4 Drawing Sheets

CAMERA POSITIONING DEVICE

TECHNICAL FIELD AND INDUSTRIAL APPLICABILITY OF THE INVENTION

The present invention relates generally to the positioning of a camera at a remote location below the camera operator, and more particularly, to a manual positioning device for positioning a camera in a remote location that utilizes a spring force to provide stationary viewing in any direction.

BACKGROUND OF THE INVENTION

Currently, there are two types of cameras in use in reactor vessel work, namely black and white cameras and color cameras. Black and white cameras are generally based on tube technology, are radiation resistant, and are typically in the shape of a one foot long, one inch diameter tube. Because an operator cannot get into a reactor vessel once the plant is operational, remotely positioned cameras must be used to perform inspections inside the reactor vessels. Directing these black and white cameras in the reactor vessel is generally performed by twisting and adjusting a rope tied to the head of the camera and the camera cable that comes out of the back end of the cylindrical camera tube. Because the camera is not held by anything rigid, camera positioning is easily affected by any flow in the water in the area. Rotating the camera by twisting the rope and the cable is extremely difficult since there can be an excess of 60 feet between the operator and the camera. Moreover, if there is too much twist in the rope or the cable, the camera can swing by the desired target. Because the only balancing force is the resistance of the water around the camera, rotational adjustments of the camera's position must be made slowly. In addition, it can take a great deal of time to return the camera to the desired target if the camera swings by the target. Although motorized tool heads may assist in the positioning of the camera, these tool heads tend to greatly increase the camera package size and therefore cannot be used where space is a consideration, such as in restricted access areas in nuclear reactors.

Color cameras are typically solid state CCD technology-based and are not radiation resistant, which prevents their use in certain areas of a nuclear reactor, e.g., where access is difficult. Color cameras are usually controlled by installing them on remotely controlled positioner arms. The larger dimensions of a color camera in the positioner is less of a hindrance for most applications where the color camera can be used. However, for tasks where access is restricted and radiation dose rates do not prevent use of a color camera, a manual positioner could be used.

One such conventional manual camera positioning device is depicted in FIG. 1. In the camera positioning device 30 shown in FIG. 1, a camera holding fixture 32 is connected to a rigid handling pole 33. The camera holding fixture 32 has a first portion 34 integrally connected to a second portion 35 such that the camera holding fixture is generally in the shape of an "L". A camera 36 can be rotatably affixed to the second portion 35 so that the camera 36 is positioned to one side of the handling pole 33. A weight 38 may be added to the cable exit end of the camera 36 to raise the opposite end of the camera 36 (e.g., the lens end) when the cable 37 is slack. The camera 36 can be positioned by pulling and releasing the camera cable 37 that exits from the rear of the camera 36. Although this manual camera holding device is easy to operate, it has numerous disadvantages. For example, the camera holder 32 limits the ability of the camera 36 to be pointed upward. In addition, the weight 38 provides a counter force to pulling on the camera cable 37, which increases the weight that must be supported by the operator and increases the overall size of the camera positioner. Further, by positioning the camera 36 to the side of the handling pole 33, the camera positioning device 30 has a significant width, which can prevent its use in narrow locations.

It is therefore desirable to provide a camera positioning device that can easily and effectively stabilize a camera in a remote location that overcomes the disadvantages of the known conventional camera positioning devices.

SUMMARY OF THE INVENTION

At least one exemplary embodiment of the invention provides a camera positioning device that includes a primary support portion having an arm and two opposing support members. An adapter positioned on the arm can be formed to accept any standard handling pole, which can be rigid or semi-rigid, to provide stationary support for the camera positioning device. Multiple handling poles can be used to extend the length that the camera positioning device can be located from an operator. A holding member, such as a clamp, can be positioned between the opposing support members to hold a camera. The holding member may be formed of a first portion and a second portion. One of the first or second portions may include mounting pins. The first portion and the second portion can be joined together at a first position by a hinge pin. In addition, a safety pin may be placed through the first portion and the second portion at a second position to hold the first portion and the second portion together. A safety wire can optionally be attached to the safety pin and to one of the support members to prevent dropping the safety pin when it is removed from the holding member. The camera can be held in place in the holding member by the compression of a rubber gasket positioned on at least one of the first and second portions. A spring member can be located between the holding member and one of the support members to provide a spring tension to position the holding member at a reference position.

At least one other exemplary embodiment of the present invention provides a method for stably positioning a camera. In one exemplary method, a camera having an exit cable is positioned in a camera positioning device that includes a primary support portion having an arm and two opposing support members. Handling poles can be connected to an adapter positioned on the arm so that the camera positioning device can be located a distance from an operator, such as in a nuclear reactor. A spring located on the camera positioning device keeps the holding member at a reference position. Positioning the camera is accomplished by pulling on and/or releasing the exit cable. Rotation of the camera positioning device is accomplished by turning or twisting the handling pole attached to the adapter.

Exemplary embodiments of the present invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF EXEMPLARY EMBODIMENTS OF THE INVENTION

Figure 1:
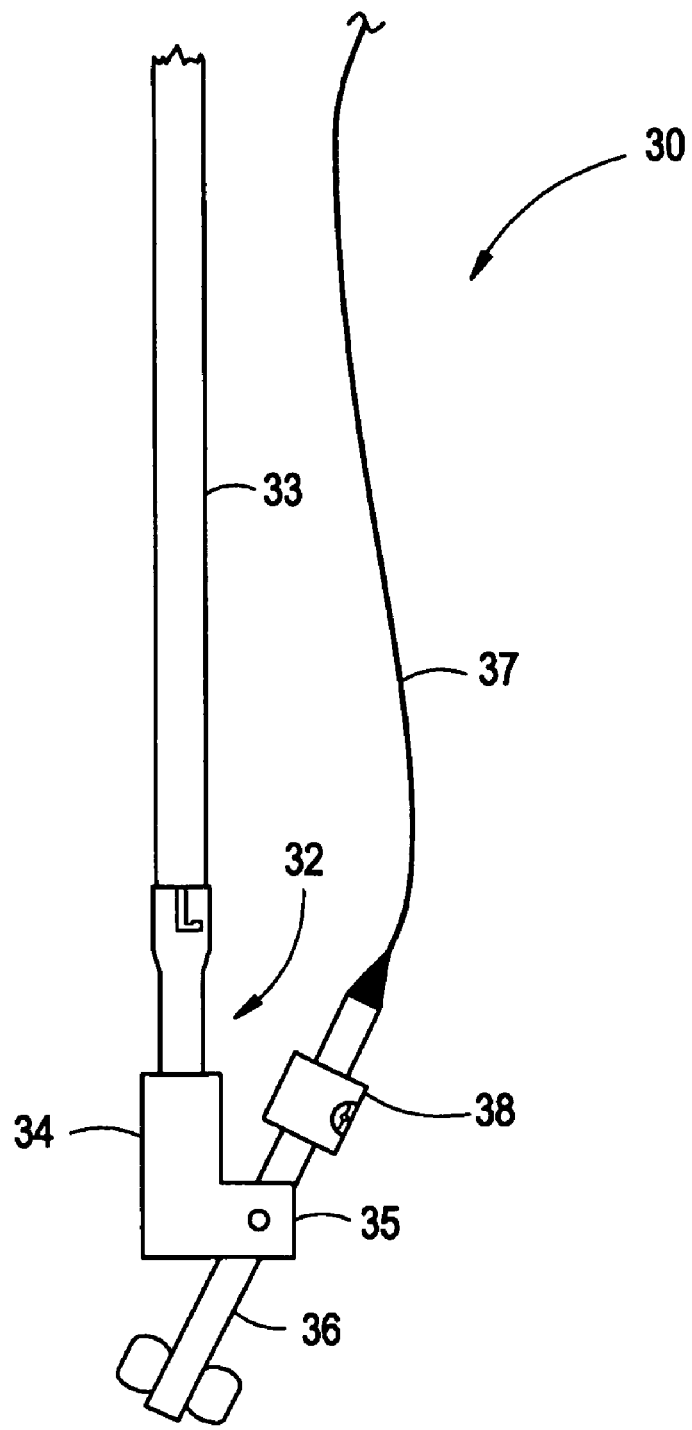
FIG. 1 is a side elevational view of a conventional camera positioning device.
Figure 2:
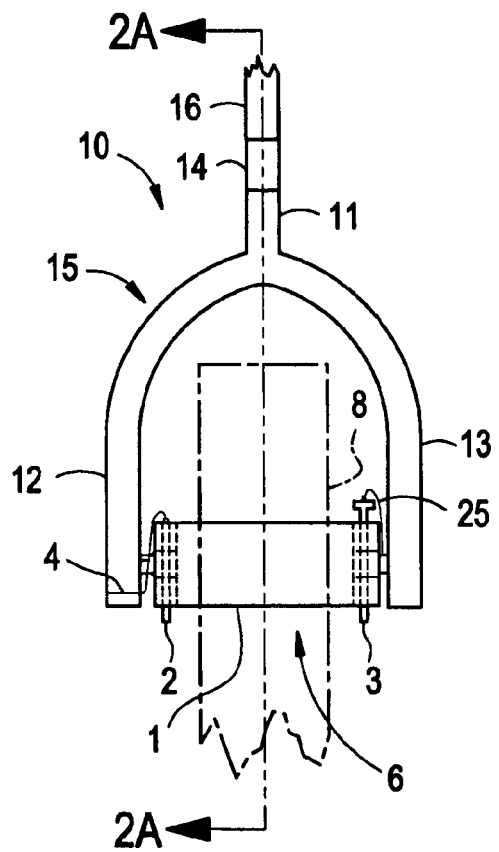
FIG. 2 is a front profile view of a first exemplary embodiment of a camera positioning device according to the present invention with the holding member in a first reference position.

Referring to FIGS. 2-5, a camera positioning device according to an exemplary embodiment of the present invention can be seen. As shown in FIG. 2, the camera positioning device 10 can resemble a tuning fork with a camera 8 suspended between the ends of the two pronged fork. In particular, the camera positioning device 10 can include a primary support portion 15 that includes an arm 11 and two opposing support members 12, 13. An adapter 14 can be located on the arm 11 and can be formed to accept any standard handling pole 16, such as those used for most reactor vessel tools. The handling pole 16 can be rigid or semi-rigid to provide stationary support for the camera positioning device 10. Multiple poles 16 can be used to extend the length that the camera positioning device 10 can be located from an operator.

Figure 2A:
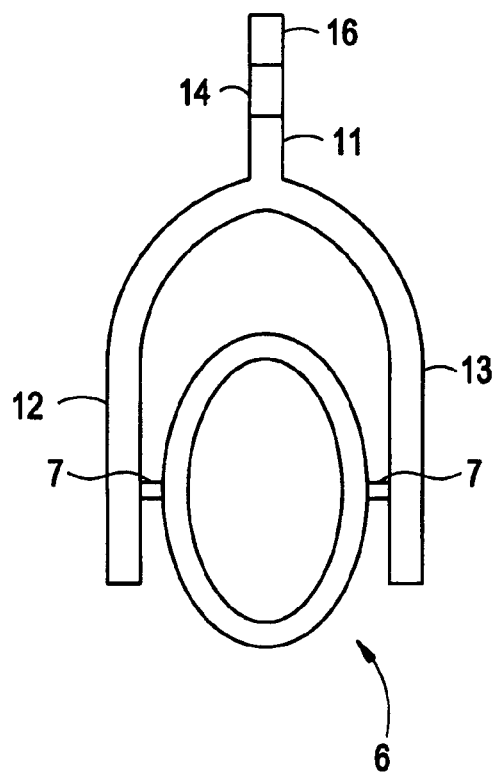
FIG. 2A is a front profile view of the first exemplary embodiment of the camera positioning device depicted in FIG. 2 with the holding member in a second reference position.

A camera 8 having an exit cable (not shown in FIGS. 2-5) can be positioned in a holding member 6, e.g., a clamp, between support member 12 and support member 13 such that the holding member 6 returns to a reference position when a spring 4 acting on the holding member 6 is in an "at rest" or least tension position (see FIG. 2). For example, the reference position for the holding member 6 may be that the holding member 6 is positioned perpendicular to the support members 12, 13 (e.g., at a 90° orientation with respect to the support members 12, 13) when the spring 4 is in the at rest or least tension position. (See FIG. 2). Alternatively, the reference position may be that the holding member 6 is positioned parallel to the support members 12, 13 (e.g., at a 0° orientation) when the spring 4 is at the at rest or least tension position. (See FIG. 2A). Alternative reference positions for the holding member 6 may include any angle from a 0° to a 360° orientation with respect to the support members 12, 13.

Figure 3:
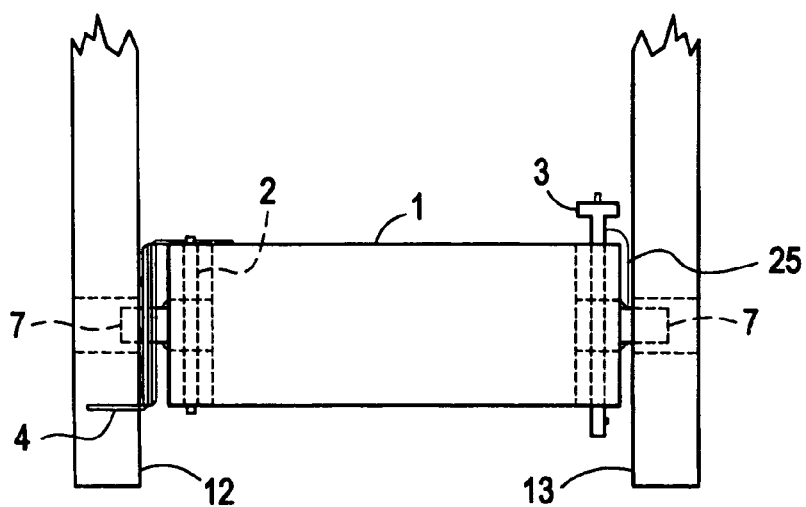
FIG. 3 is a partial enlarged profile view of the holding member positioned between the support members of the camera positioning device of FIG. 2.
Figure 4A:
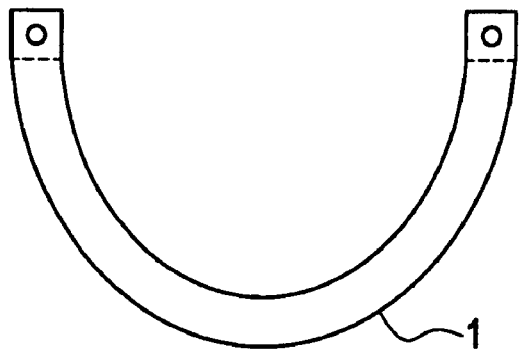
FIG. 4A is an enlarged plan view of the first portion of the holding member of the camera positioning device illustrated in FIG. 2.
Figure 4B:
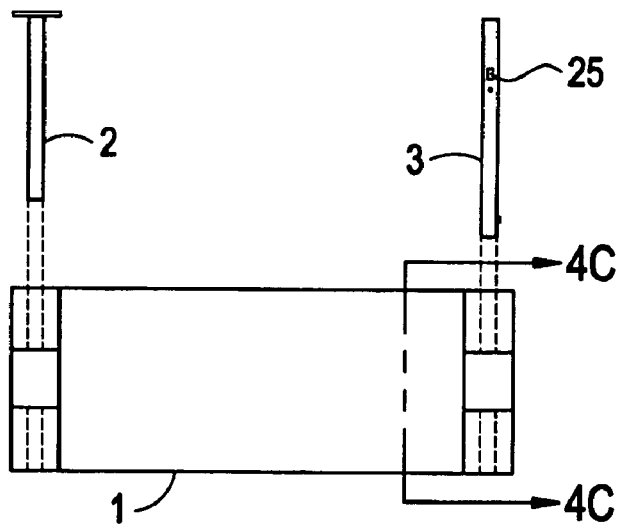
FIG. 4B is a partial profile view of the first portion of the holding member illustrated in FIG. 4A depicting a welded hinge pin and clamp closure ball detent safety pin that holds the holding member closed.
Figure 4C:
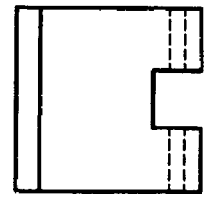
FIG. 4C is a partial view of the first portion of the holding member illustrated in FIG. 4B taken along lines 4C-4C.
Figure 5:
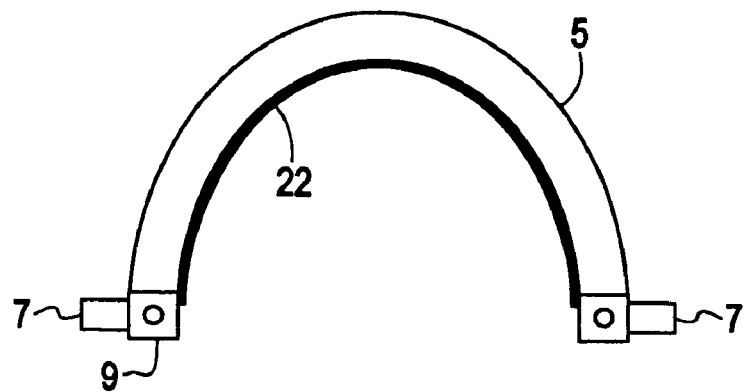
FIG. 5 is an enlarged perspective view of the second portion of the holding member illustrating the rubber pad that assists in holding the camera tight in the holding.

The camera 8 can be positioned between a first portion 1 and a second portion 5 of the holding member 6 (see FIGS. 4A and 5). The first and second portions 1 and 5 can be joined together at a first position by a hinge pin 2 (see FIGS. 3 and 4B) such that a tongue 9 (see FIG. 5) on the second portion 5 is retained by the hinge pin 2 and is free to rotate about hinge pin 2. The hinge pin 2 may be permanently affixed to the first and second portions 1, 5, such as by welding. In addition, the first portion 1 and the second portion 5 can be held together at a second position by a safety pin 3, e.g., a clamp closure ball detent safety pin (see FIGS. 2 and 3). The camera 8 may be held in place between the first and second portions 1, 5 by the compression of a first rubber gasket 22 (see FIG. 5) on the second portion 5. The first rubber gasket 22 may be located on either the first portion 1 or the second portion 5. A second rubber gasket (not shown) can be provided on the portion that does not contain the first rubber gasket 22 to provide additional support for the camera 8 in the holding member 6. A safety wire 25 can be optionally attached to support member 12, support member 13, or to a mounting pin 7 to prevent dropping the safety pin 3 when the safety pin 3 is removed from the holding member 6 (see FIGS. 2, 3 and 5).

Mounting pins 7 can be affixed to the first portion 1 or second portion 5 and can rotate in holes located in support members 12, 13 (see FIG. 3). The mounting pins 7 may be installed in holes located in the support members 12, 13 by spreading the support members 12, 13 during construction of the camera positioning device 10 using manufacturing tools, such as a hydraulic spreader. If the support members 12, 13 are rigid enough to prevent the mounting pins 7 from being pulled out of the support members 12, 13 during the use of the camera positioning device 10, no mechanical attachment hardware is needed to hold the holding member 6 in place between the support members 12, 13. Without the spring 4 or the camera 8 installed in the holding member 6, the holding member 6 would rotate freely between the support members 12, 13 of the primary support portion 15.

The spring 4 (see FIGS. 2 and 3) can be located between the holding member 6 and one of the support members 12, 13 to provide a spring tension so that the holding member 6 is positioned at a reference position when spring 4 is at the at rest or least tension position. In one exemplary embodiment, the spring 4 can be located between the second portion 5 and support member 12 (see FIG. 3). The force of the spring 4 permits the holding member 6 to be positioned at the reference position regardless of how the camera 8 is installed in the holding member 6. In other words, the camera 8 can be installed in the camera positioning device 10 with the holding member 6 located close to the lens end of the camera 8, with the holding member 6 located close to the middle of the camera 8, or with the holding member 6 located close to the end of the camera 8 opposing the lens. The spring 4 will force the holding member 6 to return to the reference position when no tension is applied to the exit cable. Thus, camera installation in the camera positioning device 10 can be varied to meet specific inspection area restrictions without losing camera positioning function. The camera positioning device 10 can be matched to any camera length, camera diameter, and camera type, including color, black and white, tube, or electronic cameras.

Alternatively, camera positioning can be accomplished without the spring 4 if the camera 8 is installed in the holding member 6 such that the center of gravity of the camera 8 causes the holding member 6 to return to the reference position when no tension is applied to the exit cable. However, it is to be noted that this alternative exemplary embodiment is not the preferred use of the camera positioning device 10 since it limits how the camera 8 can be mounted in the holding member 6 and still obtain camera position control.

In one exemplary embodiment, the exit cable exits the camera 8 at the end of the camera opposite the lens so that pulling on or releasing the exit cable causes the holding member 6 to move away from its reference position. A slight modification to the camera 8 may be required in some instances to accommodate cameras that do not have an exit cable at the end of the camera opposite the lens, but positioning the camera 8 would be affected in a manner similar to that as described below. For example, in a situation where the exit cable for the camera 8 is positioned such that pulling on or releasing the exit cable does not move the holding member 6 away from its reference position, the camera 8 may be modified to make the exit cable exit from the rear of the camera 8 with temporary or permanent modifications, such as by taping the cable along the side of the camera 8 so that the exit cable is directed out the rear of the taped camera package or by manufacturing a housing for the camera 8 that directs the exit cable out the rear of the camera package. Other modifications to the camera 8 or alternate positions for the exit cable such that pulling on or releasing the exit cable results in the holding member 6 moving away from the reference position are within the purview of one of skill in the art.

The first and second portions 1, 5 and the first rubber gasket 22 can be sized so that the camera 8 will not slide in the holding member 6 when the safety pin 3 is inserted through the first portion 1 and the second portion 5 to hold the holding member 6 in a closed configuration. This simple mounting design reduces the number of parts used to hold the camera 8 in the camera positioning device 10, and helps to reduce the risk of lost parts. In addition, the rubber gasket 22 provides a tight grip on the camera 8 to assist in preventing the camera 8 from slipping in the holding member 6 regardless of variations in camera dimensions for a particular type of camera 8. Further, the camera 8 can be easily and rapidly installed and removed with little or no tools.

Figure 6:
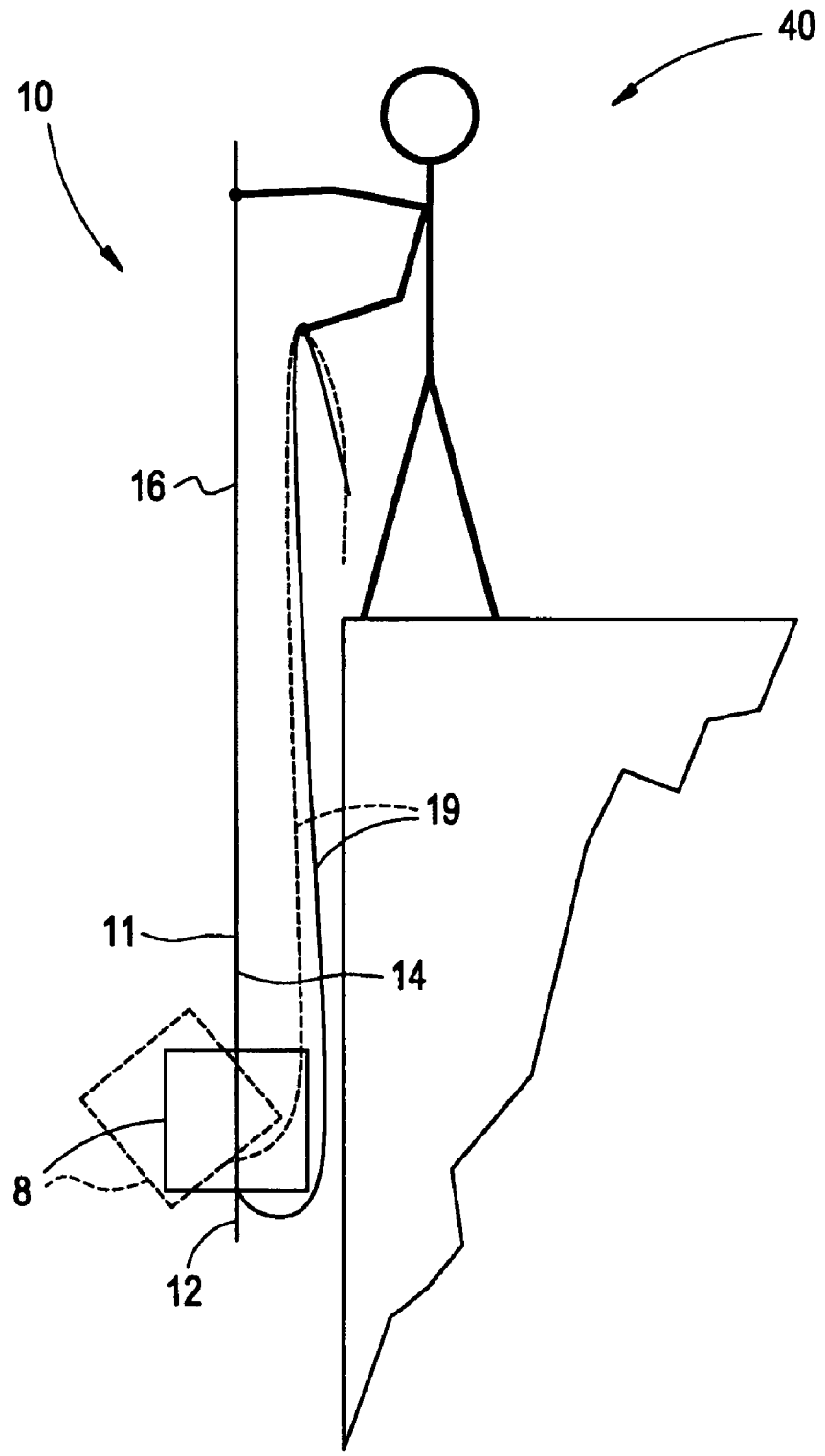
FIG. 6 is an illustration depicting the operation of an embodiment of a camera positioning device according to an exemplary embodiment of the present invention.

Operation of the camera positioning device 10 will now be described with reference to FIG. 6. An operator 40 lowers the camera positioning device 10 into the location to be inspected (e.g., in a nuclear reactor) by adding handling poles 16 to the adapter 14 until the camera 8 is located at the desired height, e.g., either above, below, or level to the location to be inspected. To rotate the camera positioning device 10 about axis A defined by the arm 11 (see FIG. 2), an operator turns the handling pole 16 attached to the adapter 14. As shown in FIG. 6, pulling on the exit cable 19 moves the camera 8 away from its initial position (as illustrated by the dotted lines) and positions the camera 8 at a different orientation. Namely, pulling the exit cable 19 causes the camera 8 to rotate about an axis defined by the mounting pins 7.

For example, as illustrated in FIG. 6, in an exemplary embodiment where the reference position of the holding member 6 is a 90° orientation with respect to the support members 12, 13 and the camera 8 is placed in the holding member 6 such that a lens of the camera 8 faces toward the arm 11 (see FIG. 2), the position of the camera lens can be adjusted to point away from the arm 11 by pulling on the exit cable 19. In particular, the operator 40 can pull on the exit cable 19 and move the lens of the camera 8 away from the arm 11 as long as there is no mechanical interference between the camera 8, the support members 12, 13, and the arm 11, such as, for example, by a light (not shown) that may optionally be affixed to the camera 8. This movement of the exit cable 19 causes the camera 8 to rotate about the mounting pins 7, thereby bringing the lens of the camera 8 away from the arm 11 against the spring tension. Thus, in this exemplary embodiment, the camera 8 located in the camera positioning device 10 can be positioned at any angle approximately 180° between the support legs 12, 13 by pulling on the exit cable.

To return the holding member 6 to its reference position and re-position the lens of the camera 8 so that it again faces the arm 11, the operator 40 releases some of the exit cable 19 to let the spring tension move the lens of the camera 8 back toward the arm 11. When the exit cable 19 is completely released and no tension is applied to the exit cable 19, the tension of the spring 4 returns the holding member 6 to its reference position.

The combination of positioning the height of the camera 8, positioning the camera 8 to the left or right of the object to be viewed, positioning the camera 8 by rotating the handling pole 16, and controlling the camera angle by pulling on the exit cable 19 permits an operator 40 to view an object from any accessible angle. The interaction of the spring tension and cable pull permits the camera orientation to be maintained almost indefinitely. In addition, because the location of the camera 8 can be controlled by the handling poles 16 and the mutually opposing forces applied by the spring 4 and the operator 40 pulling the exit cable 19, flow in the location of the camera 8 will not cause the camera 8 to move unless the flow is so great that the operator 40 cannot hold the camera 8 in position against the flow.

Further, because the camera positioning device 10 is manually controlled and does not contain any bulky electrical parts, the dimensions of the positioning device 10 only slightly increase the overall dimensions of the camera 8 installed in the camera positioning device 10. Thus, the camera positioning device 10 has the advantage of being able to rigidly position the camera 8 at any angle allowed by the location geometry, while still maintaining the ability to get into small areas. For example, for inspection locations with limited access or where it is desired to inspect an object or area below the operator, the operator moves the camera lens to an approximate 180° orientation with respect to the arm 11 (e.g., positions the lens of the camera 8 such that it faces away from the arm 11) by pulling on or releasing the exit cable before inserting the camera positioning device 10 into the limited access area. Once in the restricted area, the operator can then release or pull on the exit cable to position the camera 8 as much as the length of the camera 8 will permit in the restricted space. The camera angle can be controlled by adjusting the amount of cable tension or pull against the spring tension.

The invention of this application has been described above both generically and with regard to specific embodiments. Although the invention has been set forth in what is believed to be the preferred exemplary embodiments, a wide variety of alternatives known to those of skill in the art can be selected within the generic disclosure. The invention is not otherwise limited, except for the recitation of the claims set forth below.

I claim:

1. A camera positioning device comprising:

a primary support portion having first and second support members, a portion of the first support member opposing a portion of the second support member;

a holding member rotatably supported between the opposing portions of the first and second support members, the holding member configured to hold the camera housing, the holding member having a first portion and a second portion opposite the first portion; and a spring member having a first end and a second end, the first end of the spring member being attached to the holding member and the second end of the spring member being attached to one of the support members to dispose the holding member in a reference position relative to the first and second support members, wherein the holding member is configured to rotate about 180 degrees from the reference position.

2. The camera positioning device of claim 1, further comprising an arm connected to the primary support portion.

3. The camera positioning device of claim 2, further comprising an adapter connected to the arm.

4. The camera positioning device of claim 3, further comprising a handling pole connected to the adapter.

5. The camera positioning device of claim 1, wherein at least one of the first portion and the second portion includes a rubber gasket.

6. The camera positioning device of claim 1, wherein the first portion and the second portion are held together at a first position by a pin.

7. The camera positioning device of claim 6, wherein the pin is a safety pin.

8. The camera positioning device of claim 6, wherein a wire is affixed to the pin and to one of the first and second support members.

9. The camera positioning device of claim 6, wherein the first portion and the second portion are held together at a second position by a hinge pin, at least one of the first and second portions being rotatable about the hinge pin.

10. The camera positioning device of claim 1, wherein one of the first and second portions includes mounting pins, the holding member being rotatable about an axis defined by the mounting pins.

11. A method for stably positioning a camera at a remote location comprising:
- placing a camera having an exit cable in a camera positioning device including:
  - a primary support portion having first and second support members, a portion of the first support member opposing a portion of the second support member;
  - a holding member rotatably supported between the opposing portions of the first and second support members, the holding member configured to hold the camera housing, the holding member having a first portion and a second portion opposite the first portion; and
  - a spring member having a first end and a second end, the first end of the spring member being attached to the holding member and the second end of the spring member being attached to one of the support members to dispose the holding member in a reference position relative to the first and second support members, wherein the holding member is configured to rotate about 180 degrees from the reference position;
- placing the camera positioning device housing the camera in an area to be inspected; and
- positioning the camera by applying tension to the exit cable to counteract a spring tension and rotate the holding member.

12. The method of claim 11, further comprising:
affixing at least one handling pole to the primary support portion.

13. The method of claim 12, further comprising:
rotating the camera positioning device by turning the handling pole.

14. The method of claim 11, wherein in the positioning step, applying tension to the exit cable rotates the holding member away from the reference position.

15. The method of claim 14, wherein in the positioning step, the tension is applied by pulling on the exit cable.

16. The method of claim 15, further comprising:
releasing at least a portion of the exit cable to release the tension to the exit cable.

17. The method of claim 11, further comprising:
positioning the camera between the first portion and the second portion of the holding member; and
inserting a pin through the first and second portions at a first position to hold the first portion and the second portion together.

18. The method of claim 17, further comprising:
inserting a safety pin through the first and second portions at a second position to place the holding member in a closed configuration.

19. The method of claim 11, wherein one of the first and second portions includes mounting pins, the holding member being rotatable about an axis defined by the mounting pins.

* * * * *